United States Patent [19] [11] 3,725,360
Adams [45] Apr. 3, 1973

[54] PROCESS FOR POLYMERIZING STYRENE AND MALEIC ANHYDRIDE

[75] Inventor: Jack J. Adams, Midland, Mich.

[73] Assignee: The Dow Chemical Company, Midland, Mich.

[22] Filed: Mar. 11, 1971

[21] Appl. No.: 123,386

[52] U.S. Cl. ............................................. 260/78.5 R
[51] Int. Cl. ............................. C08f 1/72, C08f 15/02
[58] Field of Search ................... 260/78.5 R, 78.5 HC

[56] References Cited

UNITED STATES PATENTS 2,396,997  3/1946  Fryling ............................. 260/83.1
2,606,891  8/1952  Rowland ........................... 260/78.5
2,872,436  2/1959  Hibbard ............................ 260/78.5
3,535,290  10/1970  Hay et al. ......................... 260/78.5

Primary Examiner—James A. Seidleck
Assistant Examiner—John Kight, III
Attorney—Griswold & Burdick, H. L. Aamoth and A. R. Lindstrom

[57] ABSTRACT

High yields, without the application of heat, are obtained when styrene and maleic anhydride are polymerized in the presence of a tertiary aliphatic mercaptan and certain metals. Preferably the monomers are dissolved in a halogenated aliphatic hydrocarbon solvent.

12 Claims, No Drawings

PROCESS FOR POLYMERIZING STYRENE AND MALEIC ANHYDRIDE

Background of the Invention

The polymerization of styrene-maleic anhydride and like copolymers is normally carried out by thermal means and usually in the presence of a free radical yielding catalyst such as benzoyl peroxide and the like. Numerous patents describe these well known polymerization techniques. U.S. Pat. No. 2,872,436 describes such a process capable of producing high molecular weight copolymers by polymerizing the monomers at 35°C to 45°C in solution in methylene chloride and in the presence of a peroxide catalyst. U.S. Pat. No. 2,606,891 describes the polymerization of styrene and maleic anhydride to low molecular weight copolymers employing both a peroxide catalyst and a mercaptan. The mercaptan is used in large amounts, 5 to 25 percent and as much as 40 percent on the weight of the monomers. Such large amounts of mercaptan present difficulties in purification, odor, etc.

Summary of the Invention

It has now been found that styrene-maleic anhydride and like copolymers may be obtained in high yields without supplemental heating and without a peroxide catalyst by employing from about 0.001 to 1 percent of a tertiary aliphatic mercaptan and at least 1 ppm of a metal, both based on the weight of the monomers. Preferably the monomers are dissolved in certain halogenated aliphatic hydrocarbon solvents. The metal is selected from the group consisting of Fe, Cu, Zn, Cr and Hg and are preferably added as an inorganic metal salt.

Description of the Invention

Styrene-maleic anhydride and like polymers are well known thermoplastic polymers which may be molded into a variety of useful articles having better heat and solvent resistance than do polystyrene resins. In addition the copolymers have a reactive anhydride group and can be readily converted to water soluble polyelectrolytes by reaction with a variety of bases. The copolymers have further utility in that they may be readily crosslinked by heating with polyfunctional reactants such as polyols, polyamines, polyepoxides and the like.

According to this invention styrene-maleic anhydride copolymers may be prepared in high yield without the need of supplemental heating and may be mass polymerized. However, the polymerization exotherm is more readily controlled by conducting the polymerization in a solution of the monomers in certain solvents.

For convenience the copolymers will be referred to as styrene-maleic anhydride copolymers but the invention contemplates certain other copolymers wherein certain monomers may partially or completely replace either or both the styrene and maleic anhydride. In addition to styrene one may employ chloro- or bromostyrene (any of the position isomers). Suitable unsaturated dicarboxylic acid anhydride monomers in addition to maleic anhydride include itaconic anhydride, aconitic anhydride, citraconic anhydride and the various substituted maleic anhydrides such as chloromaleic anhydride and the like. The polymers may also include minor amounts of at least one other copolymerizable monomer such as acrylonitrile, the alkyl esters of acrylic and methacrylic acid, vinyl acetate and the like.

The proportions of monomers include from about 30 to 50 weight percent of said anhydride monomer, about 70 to 50 weight percent of said styrene monomers and 0 to 10 weight percent of said other monomer.

The polymerization of styrene-maleic anhydride copolymers is conducted in the presence of about 0.001 to 1 weight percent, based on the weight of the monomers, of a tertiary aliphatic mercaptan and at least 1 ppm of a metal, based on said monomers, of a metal selected from the group consisting of Fe, Cu, Zn, Cr and Hg, preferably in the presence of Fe and Cu. The polymerization may be run in the presence or absence of air.

As little as 0.001 percent of the mercaptan is effective and while larger amounts may be used, no advantage is found in employing amounts greater than 1 percent. In fact larger amounts present certain disadvantages from a purification standpoint and especially from an odor standpoint. Only tertiary mercaptans are useful in this invention since primary and secondary mercaptans are ineffective. The term, tertiary, is employed with its usual meaning, i. e. that the carbon atom to which the mercaptan group is bonded is completely substituted with at least a methyl group for each valence bond. Consequently t-butyl mercaptan is the simplest t-aliphatic mercaptan. Typical mercaptans also include t-amyl mercaptan, t-dodecyl mercaptan and the like. Generally mercaptans having from five to about 12 to 15 carbon atoms are preferred.

The metal component is preferably added to the monomers as an inorganic metal salt and frequently as a solution in an inert organic solvent such as tetrahydrofuran. The amount of any such metal solvent which is employed is so small that most any inert organic solvent that is capable of dissolving the metal salt may be used. A variety of salt forms may be used such as the chloride salts, e.g. $FeCl_3$, $CuCl$, $ZnCl_2$, $CrCl_3$ and $HgCl$. Other salts include the nitrates, sulfates, etc. Preferably Fe or Cu as the chloride salts are employed.

Preferably the polymerization is run in a solvent for the monomers in order to better control the polymerization exotherm. For this purpose only certain solvents have been found useful. Said solvents include the halogenated, usually the chlorinated, aliphatic hydrocarbon solvents wherein no carbon has more than 2 halogen substituents. Typical solvents include methylene chloride, ethylene chloride (also called ethylene dichloride) trichloroethane and the like. Said hydrocarbon solvent preferably contains from one to about six carbon atoms. Brominated hydrocarbons may be employed in place of the chlorinated solvents.

The following non-limiting examples will further illustrate the invention. All parts and percentages are by weight unless otherwise specified.

EXAMPLE 1

The following monomer mixture was prepared and loaded into a 2-oz. wide mouth bottle;

17.5 gm styrene (70%)
7.5 gm maleic anhydride (30%)
1 ppm Fe, added as a $FeCl_3$ solution in tetrahydrofuran (THF)
0.3% t-dodecyl mercaptan Static mass polymerization was carried out at room temperature. The temperature rose to 60–70°C and a solid mass of polymer was formed. Polymerization was essentially complete in 1 hour. The polymer mass was broken up, washed with methanol and dried. A yield of 23 gms (91.8 percent) 91.8 a white polymer was obtained which had a 1 percent solution viscosity in methyl ethyl ketone (MEK) at 25°C of 1.831 (M. W. of about $10^6$) and contained about 32 percent maleic anhydride by oxygen analysis (15.7 percent O).

EXAMPLE 2

The following mixture was polymerized:
12.5 gm styrene (50%)
12.5 gm maleic anhydride (50%)
80.0 gm ethylene chloride
1 ppm Fe, FeCl$_3$ solution in THF
0.3% t-dodecyl mercaptan Polymerization was initiated after a few minutes and the temperature gradually rose to about 45°C. The polymer precipitated out as it was formed and eventually formed a thick slurry. After 1 hour excess methanol was added and the polymer recovered by filtration and drying. A yield of 21.7 gm (87 percent) was obtained and the polymer contained about 51.4 percent maleic anhydride (25.7 percent O) and had a 1 percent viscosity of 1.810 (M.W. about $10^6$)

EXAMPLE 3

A terpolymer was prepared from the following mixture:
4.5 gm styrene (45%)
5.0 gm maleic anhydride (50%)
0.5 gm acrylonitrile (5%)
90 gm ethylene chloride
2 ppm Fe (FeCl$_3$ in THF)
0.3% t-dodecyl mercaptan The above mixture was polymerized as in example 2. After 16 hours the polymer was recovered as before, yielding 8.05 gm (80.5 percent) of polymer. The polymer had a 1 percent viscosity of 2.525 and contained 48.8 percent maleic anhydride (24.4 percent O) and 1.4 percent acrylonitrile.

EXAMPLE 4

In a manner similar to example 1 a polymer was prepared from:
25 gm monomer (30% maleic anhydride; 70% O-chlorostyrene
1 ppm Fe (FeCl$_3$ in THF)
0.1% t-dodecyl mercaptan
(no solvent)

The mixture was mass polymerized at 25°C for 16 hours and a yield of 87.7 percent of recovered polymer obtained.

EXAMPLE 5

The following table shows the effect of Fe and t-dodecyl mercaptan concentration on polymerization. All runs were mass polymerized at 25°C using a 70 percent styrene/30 percent maleic anhydride monomer mixture.

| ppm Fe* | % t-dodecyl mercaptan | % yield |
|---|---|---|
| 0.1 | 0.1 | 32.1 |
| 1.0 | 0.1 | 92.6 |
| 10.0 | 0.1 | 93.2 |
| 25.0 | 0.1 | 93.5 |
| 1.0 | 0.001 | 89.1 |
| 1.0 | 0.1 | 90.5 |
| 1.0 | 0.3 | 91.8 |
| 1.0 | 1.0 | 92.6 |

*FeCl$_3$ in THF

EXAMPLE 6

The effect of maleic anhydride concentration was evaluated by mass polymerization similar to the previous examples employing 1 ppm of Fe (FeCl$_3$ in THF) and 0.1 percent t-dodecyl mercaptan.

| % Styrene | % Maleic Anhydride | % Yield |
|---|---|---|
| 100 | ----- | (Trace) |
| 99 | 1 | 2% |
| 95 | 5 | 14.4 |
| 90 | 10 | 28.8 |
| 80 | 20 | 45.8 |
| 70 | 30 | 92.0 |

EXAMPLE 7

The following solvents were found to be effective solvents by polymerization tests similar to the previous examples: methylene chloride, ethylene chloride and trichlorethane.

The following solvents were ineffective: methyl ethyl ketone, carbon tetrachloride, toluene, heptane, tetrahydrofuran and chlorotoluene.

Similarly the following metal salts were found to be effective in polymerizations similar to the previous examples: CuCl, ZnCl$_2$, CrCl$_3$ and HgCl.

In addition to t-dodecyl mercaptan, t-butyl and t-amyl mercaptans were also found effective.

While the intent of this invention is to be able to polymerize at lower temperatures without supplemental heat, the polymerization may be conducted at elevated temperatures if desired.

What is claimed is:

1. In a process for polymerizing a mixture of monomers consisting of about 30–50 weight percent of an unsaturated dicarboxylic acid anhydride, 70–50 weight percent of styrene, chlorostyrene or bromostyrene and 0 to 10 weight percent of at least one other copolymerizable monomer the improvement which consists of conducting the polymerization in the presence of 0.001 to 1 percent by weight, based on said monomers, of a tertiary aliphatic mercaptan and at least 1 ppm, based on said monomers, of a metal as a metal salt wherein the metal is selected from the group consisting of Fe, Cu, Zn, Cr and Hg.

2. The process of claim 1 wherein said monomers are dissolved in a halogenated aliphatic hydrocarbon having no more than two halogens attached to any one carbon atom.

3. The process of claim 2 wherein said solvent is ethylene chloride, methylene chloride or trichloroethane.

4. The process of claim 2 wherein said monomers are styrene and maleic anhydride.

5. The process of claim 2 wherein said monomers are styrene, maleic anhydride and acrylonitrile.

6. The process of claim 2 wherein said metal is a halide salt.

7. The process of claim 6 wherein said salt is FeCl$_3$ or CuCl.

8. The process of claim 2 wherein said mercaptan is t-butyl, t-amyl or t-dodecyl mercaptan.

9. The process of claim 1 wherein said monomers are styrene and maleic anhydride.

10. The process of claim 1 wherein said metal is a halide salt.

11. The process of claim 10 wherein said salt is FeCl$_3$ or CuCl.

12. The process of claim 1 wherein said mercaptan has from five to about 15 carbon atoms.

* * * * *